(12) United States Patent
Tadas et al.

(10) Patent No.: US 7,590,300 B2
(45) Date of Patent: Sep. 15, 2009

(54) IMAGE FILTERING METHODS AND APPARATUS

(75) Inventors: Shashikiran H. Tadas, Tempe, AZ (US); Kalpesh D. Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 10/876,235

(22) Filed: Jun. 24, 2004

(65) Prior Publication Data

US 2005/0286792 A1    Dec. 29, 2005

(51) Int. Cl.
*G06K 9/40* (2006.01)

(52) U.S. Cl. .......................... 382/260; 358/22; 382/41; 375/240.29

(58) Field of Classification Search .................. 382/260
See application file for complete search history.

(56) References Cited

U.S. PATENT DOCUMENTS

| | | | |
|---|---|---|---|
| 4,747,157 A * | 5/1988 | Kurakake et al. | 382/303 |
| 5,241,372 A * | 8/1993 | Ohba | 348/578 |
| 6,246,783 B1 * | 6/2001 | Avinash | 382/128 |
| 6,600,495 B1 * | 7/2003 | Boland et al. | 345/660 |
| 2004/0062316 A1 * | 4/2004 | Xiong et al. | 375/240.29 |

* cited by examiner

*Primary Examiner*—Samir A. Ahmed
*Assistant Examiner*—Tsung-Yin Tsai
(74) *Attorney, Agent, or Firm*—Schwegman, Lundberg & Woessner, P.A.

(57) ABSTRACT

In one embodiment, a method and apparatus for filtering input pixel data is configurable to perform a one-dimensional or two-dimensional filtering process. Further, in one embodiment, the two-dimensional filter can be configured to perform a separable or non-separable filter. The type of filter can be configured, along with the size of the filter and other parameters. During operation, a stage I filtering operation performs a portion of the filter, and temporarily stores the result in a storage element. If the filter is a one-dimensional filter, then the results are sent to be post-processed. If the filter is a two-dimensional filter, then a stage II filtering process is performed or the intermediate results are added together, based on whether the filter is separable or non-separable. These results are then post-processed.

20 Claims, 7 Drawing Sheets

IMAGE FILTERING METHODS AND APPARATUS

TECHNICAL FIELD

The inventive subject matter pertains to image processing methods and apparatus and, more particularly, to image processing methods and apparatus that employ a coefficient filter for processing pixels that constitute a video image.

BACKGROUND

Traditionally, the image processing functions in document imaging applications have been handled by fixed-function devices, such as application specific integrated circuits (ASICs). ASICs tend to be expensive to develop, have long development cycles, and are not very flexible. On the other hand, existing programmable solutions, such as digital signal processors (DSPs) are not optimized for pixel-based processing. Developers continuously strive to create more flexible, high-performance image processing solutions.

BRIEF DESCRIPTION OF THE DRAWINGS

The appended claims point out different embodiments of the inventive subject matter with particularity. However, the detailed description presents a more complete understanding of the inventive subject matter when considered in connection with the figures, wherein like-reference numbers refer to similar items throughout the figures and:

DETAILED DESCRIPTION

In the following description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter. It is to be understood that other embodiments may be utilized, and that process or mechanical changes may be made, without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. It will be recognized that the methods of various embodiments can be combined in practice, either concurrently or in succession. Various permutations and combinations will be readily apparent to those skilled in the art.

Image processing systems often use coefficient filters to perform document imaging tasks such as image smoothing, scaling, enhancement, and segmentation, to name a few. Several types of coefficient filters may be used to achieve these tasks, including one-dimensional (1-D) or two-dimensional (2-D) filters. Further, 2-D filters can be "separable" or "non-separable." These various filter types will be described in more detail, later, in conjunction with the various described embodiments.

Embodiments of the inventive subject matter include methods and apparatus for filtering image data, where the filter characteristics can be selectively configured. Filter characteristics that can be configured include, but are not limited to, the filter type, filter coefficients, and/or the number of filter taps. Embodiments of the inventive subject matter may be implemented in a number of different types of systems. For example, but not by way of limitation, embodiments may be implemented in scanners, digital copiers, printers, fax machines, digital cameras, multi-function peripherals (MFPs), and other image processing systems.

Figure 1:
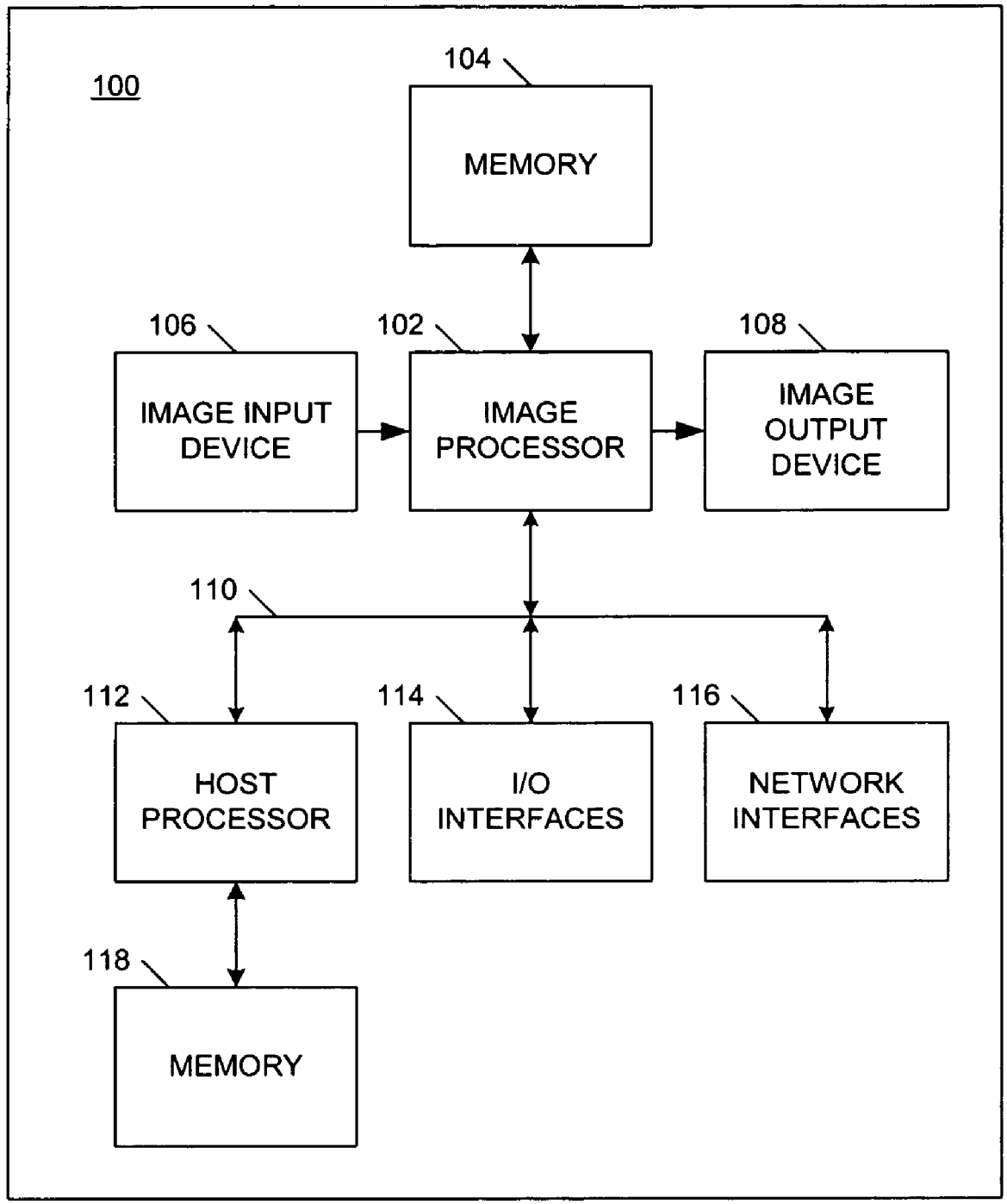
FIG. 1 is a simplified block diagram of an image processing system, in accordance with an embodiment of the inventive subject matter.

FIG. 1 is a simplified block diagram of an image processing system 100, in accordance with an embodiment of the inventive subject matter. System 100 includes one or more image processors (IP) 102, IP memory 104, one or more image input devices 106, and one or more image output devices 108. Further, in one embodiment, IP 102 may communicate over a shared bus 110 or other communication mechanism with a host processor 112, one or more input/output (I/O) interfaces 114 (e.g., universal synchronous bus (USB) interfaces, parallel ports, serial ports, telephone ports, or other interfaces), and/or one or more network interfaces 116. Host processor 112 may have access to one or more memory devices 118, as well.

Image processor 102 includes one or more devices that are capable of performing one or more image processing functions. Image processor 102 receives image data (e.g., in the form of pixel data) from IP memory 104 and/or from image input device 106. In one embodiment, image processor 102 implements a configurable, programmable coefficient filter, which filters the image data. Image processor 102 outputs the filtered image data to IP memory 104 and/or image output device 108.

Image input device(s) 106 can include any of a number of mechanisms that capture image data. For example, but not by way of limitation, an image input device 106 can include a set of sensors (e.g., CMOS/CCD sensors), a scanner or another type of image capture mechanism. Image output device(s) 108 can include any of a number of mechanisms that consume or display image data. For example, but not by way of limitation, an image output device 108 can include a printer, computer monitor or other type of image display or output mechanism.

Host processor 112 may be a special purpose or general purpose processor, in various embodiments. Further, host processor 112 may include a single device (e.g., a microprocessor or ASIC) or multiple devices. In one embodiment, host processor 112 is capable of performing any of a number of tasks that support image processing. These tasks may include, for example, downloading microcode to image processor 102, initializing and/or configuring registers within image processor 102, interrupt servicing, and providing a bus interface for uploading and/or downloading image data. In alternate embodiments, some or all of these functions can be performed by image processor 102.

Figure 2:
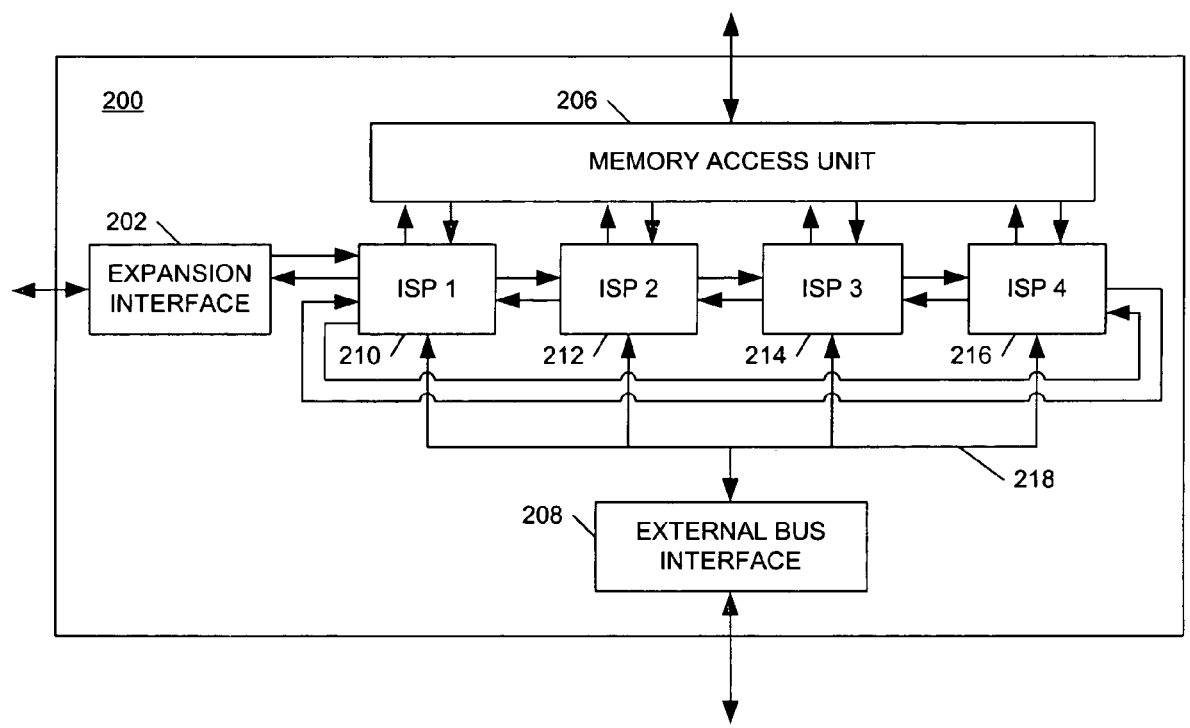
FIG. 2 is a simplified block diagram of an image processing device, in accordance with an embodiment of the inventive subject matter.

FIG. 2 is a simplified block diagram of an image processing device 200 (e.g., processor 102, FIG. 1), in accordance with an embodiment of the inventive subject matter. Image processing device 200 includes one or more expansion interfaces 202, one or more memory access units 206, one or more external bus interfaces 208, and one or more image signal processors (ISPs) 210, 212, 214, 216, in one embodiment.

Expansion interfaces 202 enable image processing device 200 to be connected to other devices and/or chips within a system, in one embodiment. Each expansion interface 202 may be programmable to accommodate the device to which it is connected. In one embodiment, each expansion interface 202 includes a parallel I/O interface (e.g., an 8-bit, 16-bit or other), and the expansion interfaces 202 simultaneously can transfer data into and/or out of the device 200.

Memory access unit 206 enables data to be stored within and/or retrieved from an external memory device (e.g., memory 104, FIG. 1). In one embodiment, memory access unit 206 supports a parallel (e.g., 8-bit, 16-bit or other) interface.

External bus interface 208 enables device 200 to connect to an external bus (e.g., bus 110, FIG. 1). In one embodiment, this enables device 200 to receive microcode, configuration information, debug information, and/or other data from an external host processor (e.g., processor 112, FIG. 1), and to provide that information to ISPs 210, 212, 214, 216 via a global bus 218.

Image data is processed by one or more ISPs 210, 212, 214, 216. ISPs 210, 212, 214, 216 are interconnected in a mesh-type configuration, in one embodiment. ISPs 210, 212, 214, 216 may process data in parallel or in series, and each ISP 210, 212, 214, 216 may perform the same or different functions. Further, ISPs 210, 212, 214, 216 may have identical or different architectures. Although four ISPs 210, 212, 214, 216 are illustrated, more or fewer ISPs 210, 212, 214, 216 may be included in a device, in various embodiments.

At least one ISP 210, 212, 214, 216 is capable of executing a coefficient filter, in one embodiment. More particularly, ISP 210, 212, 214, 216 may implement a programmable coefficient filter, and the coefficients may be reconfigured any number of times. In another embodiment, ISP 210, 212, 214, 216 may implement a non-programmable coefficient filter.

Further, at least one ISP 210, 212, 214, 216 may be configured to selectively perform any of a number of different types of coefficient filters, including but not limited to 1-D, 2-D separable, and 2-D non-separable filters. Methods and apparatus for implementing each of these filter types will be described in more detail later.

In one embodiment, the number of filter taps also may be configured. For example, but not by way of limitation, an ISP 210, 212, 214, 216 may be configured to perform a two-dimensional 3×3 (F3), 5×5 (F5), 7×7 (F7), 9×9 (F9), or 11×11 (F11) filter, or a filter having another number of taps. Below, example embodiments are described for implementing an F11 filter. It is to be understood that this is for illustration purposes only, and that filters with other numbers of taps also may be implemented using embodiments of the invention.

Further, in one embodiment, the input data format is configurable. Image data may come in any of a number of forms, but generally each data value represents a pixel intensity. Pixel data may come in the form of "single component" (i.e., LLL) values, three-component sampled (i.e., red/green/blue or RGB) values, and/or three-component sub-sampled (i.e., Lab) values. Further, the input data can be input in a single-column or multiple-column format, and the swath height (i.e., the number of pixel rows in a processing block) also can vary. In one embodiment, the column format and the swath height also are configurable.

Figure 3:
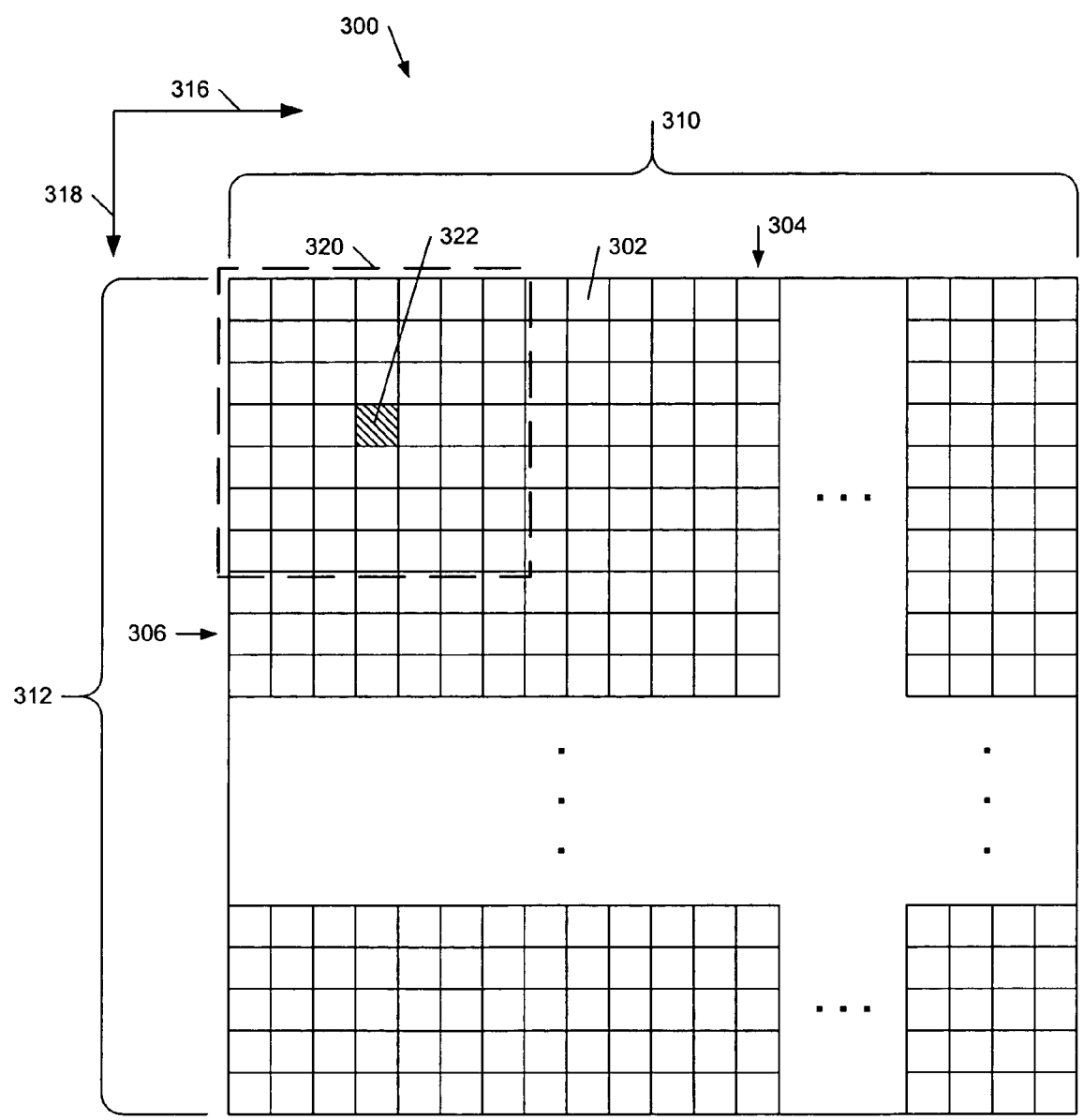
FIG. 3 is a diagram illustrating a processing block of pixels, in accordance with an embodiment of the inventive subject matter.

FIG. 3 is a diagram illustrating a processing block 300 of pixels 302, in accordance with an embodiment of the inventive subject matter. For ease of description, pixels 302 are shown as single component pixels. Those of skill in the art would understand, based on the description herein, that three-component pixel values may also be processed using embodiments of the invention.

Processing block 300 includes a number of columns 304 and a number of rows 306 of pixels 302. In one embodiment, the block width 310 is less than or equal to a full picture width. In addition, the swath height 312 is a fraction of a full picture height, in one embodiment. Accordingly, after processing of block 300 is completed, a lower (or higher) overlapping or concatenated block of pixels may be processed.

Pixel data is represented by pixel intensities, in one embodiment. The pixel data is provided to an ISP (e.g., ISP 210, FIG. 2), and stored in internal memory in a manner that corresponds to the pixel location within the processing block 300. Depending on the type of filter employed, the pixel data is filtered in a horizontal dimension 316 and/or a vertical dimension 318.

In one embodiment, during one filter iteration, a sub-block 320 of pixel data within the processing block 300 is selected, and each pixel within the sub-block is multiplied by a programmable coefficient. Further processing is performed on the multiplied pixel values to determine a filtered value for a center pixel 322 of the sub-block 320. The filtered data may then be stored, processed further or output from the ISP.

Figure 4:
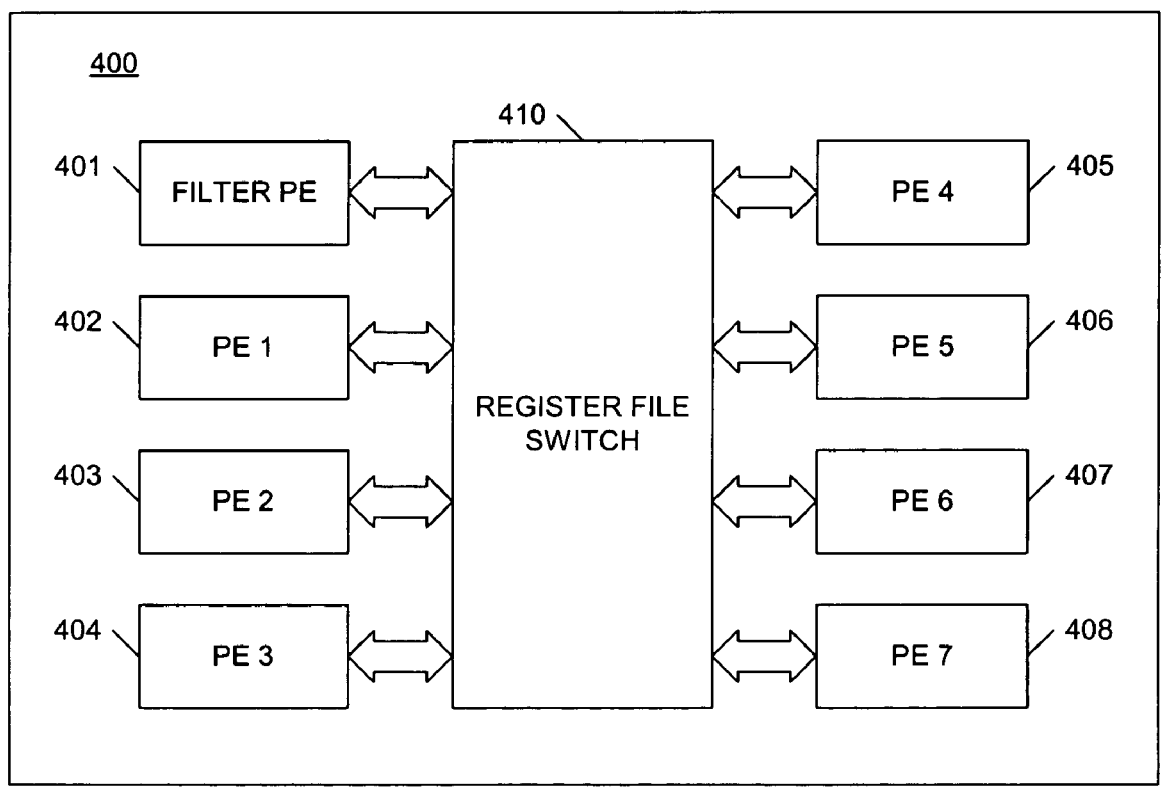
FIG. 4 is a simplified block diagram of an image signal processor, in accordance with an embodiment of the inventive subject matter.

FIG. 4 is a simplified block diagram of an ISP (e.g., ISP 210, FIG. 2), in accordance with an embodiment of the inventive subject matter. In one embodiment, ISP 400 includes one or more processing elements (PEs) 401-408, and a register file switch 510. In one embodiment, at least one PE is a filter PE, which filters pixel data according to an embodiment of the invention. For example, PE 401 is illustrated as a filter PE.

One or more of PEs 401-408 may be micro-engines, which may be programmed using micro-code, in one embodiment. Accordingly, PEs 401-408 may perform substantially the same or substantially different operations. Although eight PEs 401-408 are illustrated in FIG. 4, more or fewer PEs may be associated with an ISP.

Register file switch 410 includes a cross-bar switch, in one embodiment. Accordingly, register file switch 410 may include communication registers useful for communicating information between PEs 401-408. In one embodiment, register file switch 410 enables PEs 401-408 to communicate between each other without blocking.

Figure 5:
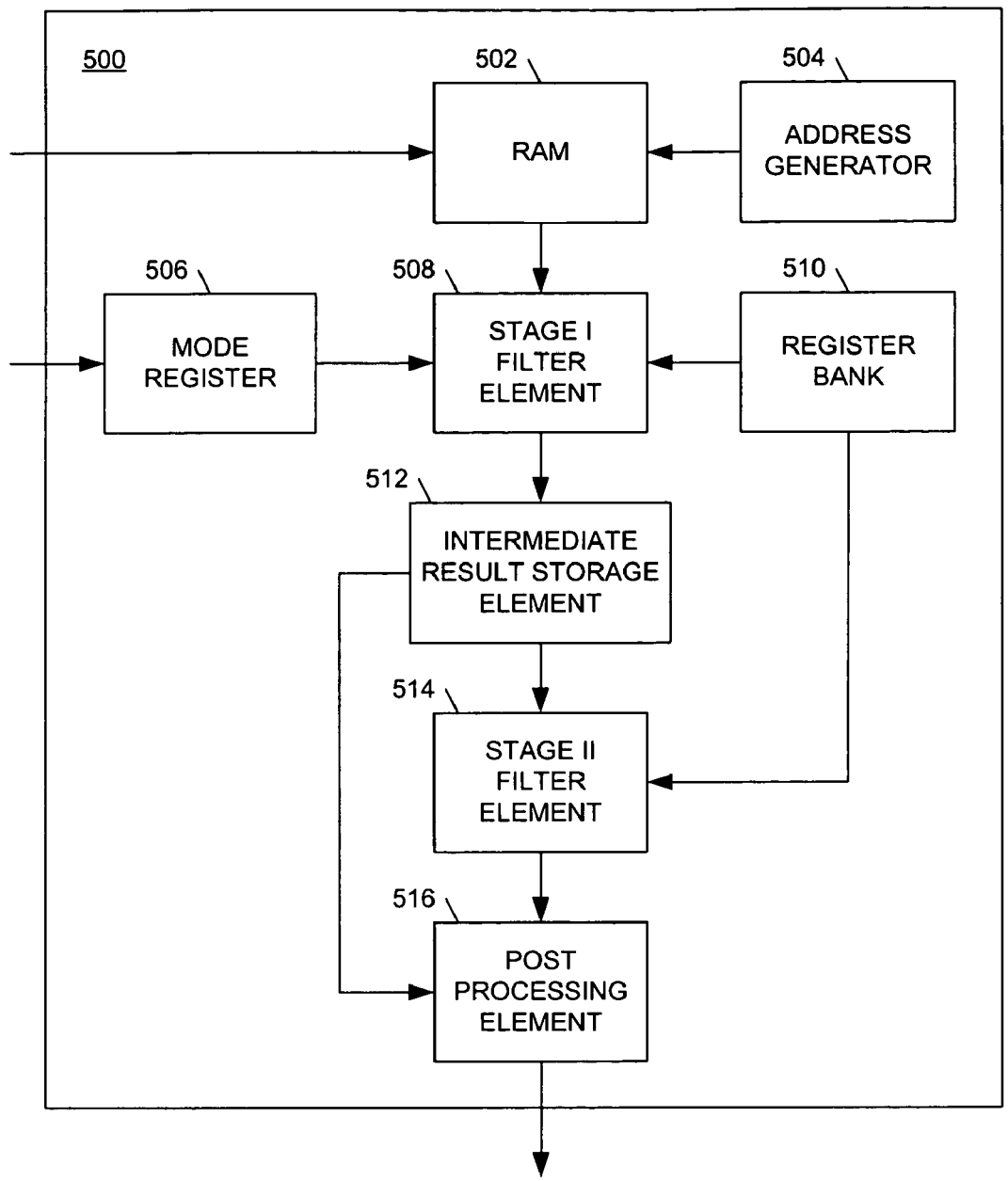
FIG. 5 is a simplified block diagram of a filter processing element, in accordance with an embodiment of the inventive subject matter.

FIG. 5 is a simplified block diagram of a filter PE (e.g., filter PE 401, FIG. 4), in accordance with an embodiment of the inventive subject matter. Filter PE 500 includes a random access memory (RAM) element 502, an address generator 504, a mode register 506, a stage I filter element 508, a register bank 510, an intermediate result storage element 512, a stage II filter element 514, and a post-processing element 516, in one embodiment.

All or a portion of a processing block of image data, in the form of digitized pixel intensity information, is initially stored in RAM 502. In one embodiment, the image data is received from an external memory interface (e.g., interface 206, FIG. 2) or an expansion interface (e.g., interface 202, FIG. 2). In one embodiment, the image data is stored in a column-wise fashion.

As discussed previously, the filter implemented using filter PE 500 is configurable in any one of a number of ways, in one embodiment. Filter PE 500 implements a filter having a specified configuration through evaluation of configuration information stored within mode register 506, in one embodiment.

Figure 6:
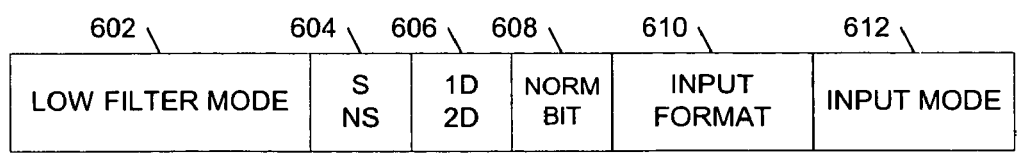
FIG. 6 is a diagram illustrating a format of a mode register, in accordance with an embodiment of the inventive subject matter.

FIG. 6 is a diagram illustrating a format of a mode register 600, in accordance with an embodiment of the inventive subject matter. Mode register 600 may include a number of fields, such as a filter mode field 602, a separable/non-separable (S_NS) field 604 a 1-D__2-D field 606, a normalization selector (NORM BIT) field 608, an input format field 610, an input mode field 612, a CC_EN field (not shown), an ON field (not shown), and a SR field (not shown), in one embodiment.

The filter mode field 602 indicates the filter being implemented. For example, this field may indicate that the filter is an F3, F5, F7, F9, F11, or other size coefficient filter. The filter size indicates the matrix size of a sub-block of image data and corresponding coefficient matrix. In one embodiment, a sub-block is a matrix of n×m pixels from the image being filtered. In one embodiment, the n=m (i.e., the matrix is square), with an odd number of rows and columns, and the pixel being filtered is located at the center of the matrix. In other embodiments, a rectangular matrix may be used, the matrix may have an even number of rows and/or columns, and/or the pixel being filtered may occur somewhere other than the center of the matrix.

The S_NS field 604 indicates whether a separable filter or a non-separable filter is to be implemented. This field is relevant for 2-D filters, in particular.

The 1-D__2-D field 606 indicates whether a 1-D or a 2-D filter is being implemented. As will be described in more detail later, a 1-D filter implements filtering in the horizontal dimension only, whereas a 2-D filter implements filtering in both the horizontal and vertical dimensions.

The NORM_BIT field 608 indicates whether the output of the filtering process should be normalized or not. If the output should be normalized, then a normalization procedure may be applied by post-processing element 516 (FIG. 5), which will be described later.

The INPUT_FORMAT field 610 indicates whether the input pixel data is coming in as single component sampled, three-component sampled, or three-component sub-sampled format.

The INPUT_MODE field 612 indicates whether the input is coming in single column fashion or multiple-column fashion (e.g., two-column, four-column, etc.).

Although specific mode register fields are listed, above, it is to be understood that the mode register may include more, fewer or different fields, in other embodiments. For example, mode register 600 may include a field to indicate the swath height, the normalization value (i.e., the value used to multiply the filtered output if normalization is enabled), the shift value (i.e., the number of bits to right shift the filtered output), and/or other filter-related information. In addition, some or all of the information discussed above in conjunction with the mode register may be stored elsewhere or depicted in other manners.

Referring back to FIG. 5, when stage I filter element 508 is ready, data stored within RAM 502 is sent to stage I filter element 508. In one embodiment, address generator 504 is used to ensure that the image data is sent to stage I filter element 508 in a proper order, when stage I filter element 508 is ready to accept the data.

Stage I filter element 508 performs filtering in the horizontal dimension. The coefficients used by stage I filter element 508 are horizontal dimension coefficients, which are stored in register bank 510. Stage I filtering involves receiving a sub-block of pixel data from RAM 502, which corresponds physically to an image data matrix of n×m pixels from the image being filtered. Each pixel of the sub-block is multiplied by a coefficient, within a coefficient array having the same size as the matrix of pixel data. In one embodiment, matrix coefficients are stored within register bank 510 prior to processing an image.

After the stage I filtering is performed, the intermediate results produced by the stage I filtering element 508 are placed within intermediate result storage element 512, in one embodiment. Details regarding the stage I filtering will be given in conjunction with FIGS. 7-9.

Intermediate result storage element 512 holds the results of the stage I filter element 508. In one embodiment, the results are held until enough intermediate data is available to perform further processing by stage II filter element 512. In one embodiment, intermediate result storage element 512 includes one or more registers and/or RAM.

If a determination is made, based on the mode register's 1-D__2-D field (e.g., field 606, FIG. 6) and the S_NS field (e.g., field 604), that either a 1-D filter or a 2-D non-separable filter is being implemented, then the results of the stage I filtering element are passed from the intermediate result storage element 512 to post-processing element 516, which will be described later.

If a determination is made that a 2-D separable filter is being implemented, then the results of the stage I filtering element are provided to the stage II filter element 512. Stage II filtering occurs when sufficient data is available, and stage II filter element 512 is ready. During this stage, element 512 performs filtering in the vertical dimension.

In one embodiment, filtering takes place in the stage II filter element 512 in a similar fashion as in the stage I filter element 508, except that a set of vertical dimension filter coefficients are used. In one embodiment, the vertical dimension filter coefficients are stored in register bank 510 prior to processing the image, and retrieved from register bank 510 during filtering.

In the above described embodiment, stage I filter element 508 performs filtering in the horizontal direction, and stage II filter element 514 performs filtering in the vertical direction, in accordance with an embodiment. In another embodiment, stage I filter element 508 could be bypassed, and stage II filter element 514 may perform filtering only in the vertical direction. Embodiments of the invention could be used to provide filtering only in the horizontal direction, the vertical direction or both directions.

The results of the stage II filtering process (or the intermediate results, in the case of 1-D and 2-D non-separable filtering) are passed to post-processing element 516. In some embodiments, post-processing element 516 may normalize the processed image data by multiplying the data by a normalization value. Post-processing element 516 may additionally or alternatively right shift the processed image data by a number of bits, in some embodiments. Post-processing element 516 may also append data to and/or pad the processed image data with zeros during post-processing. When post-processing is completed, the processed image data may be sent out of filter PE 500 for further processing elsewhere, or for consumption.

Figure 7:
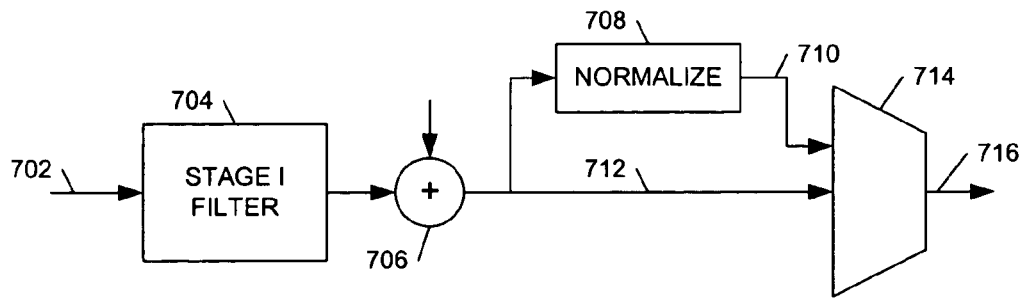
FIG. 7 is a diagram illustrating data flow for a one-dimensional filter, in accordance with an embodiment of the inventive subject matter.
Figure 8:
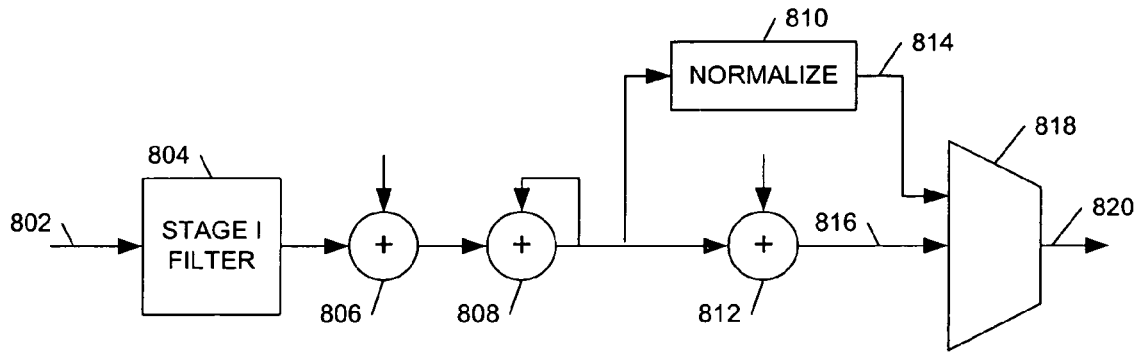
FIG. 8 is a diagram illustrating data flow for a two-dimensional, non-separable filter, in accordance with an embodiment of the inventive subject matter.
Figure 9:
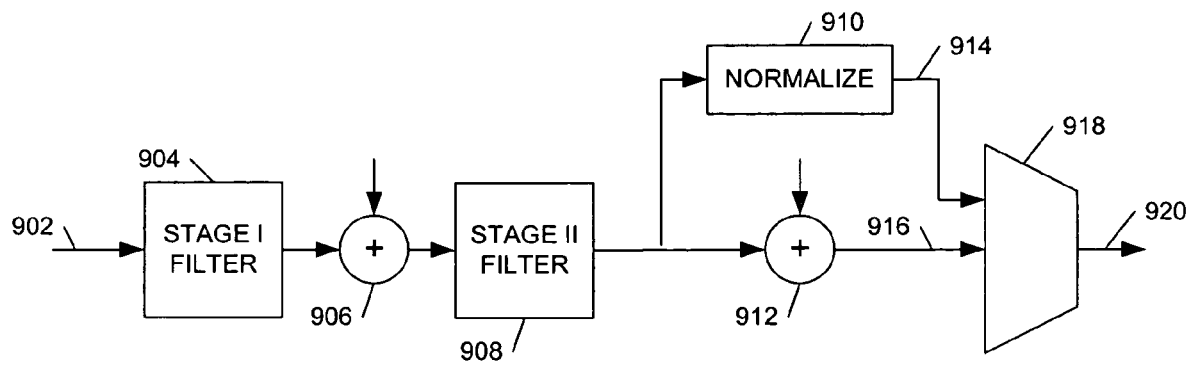
FIG. 9 is a diagram illustrating data flow for a two-dimensional, separable filter, in accordance with an embodiment of the inventive subject matter.

FIGS. 7-9 depict data flows through the apparatus of the various embodiments for 1-D, 2-D non-separable, and 2-D separable filters, respectively. Each of the data flows indicates data passage through a stage I filter and a post-processor. In addition, for the 2-D separable filter, data passage through a stage II filter is illustrated and described.

FIG. 7 is a diagram illustrating data flow for a 1-D filter, in accordance with an embodiment of the inventive subject matter. In one embodiment, input pixel data 702 from a RAM (e.g., RAM 502, FIG. 5) enters the filter.

A stage I filter 704 is implemented when enough data is brought into the stage, in one embodiment. For example, for an F7 filter, when 7×7 or 49 pixel values are available, which constitute a sub-block, then stage I filtering may be performed on the sub-block.

As mentioned previously, stage I filtering involves multiplying each pixel value within a sub-block (e.g., sub-block 320, FIG. 3) by a matrix of horizontal coefficients, and generating a sum of the products. This results in a filtered pixel value for the center pixel of the sub-block.

A rounding operation 706 is performed on the filtered result, which involves adding "1" to the result obtained in block 704, and then shifting the resulting sum to the right to get a desired number of bits.

Post-processing is then performed. In one embodiment, post-processing includes a normalization operation 708. The normalized result 710 and an un-normalized result 712 may then be selected by multiplexer 714 as an output result 716.

FIG. 8 is a diagram illustrating data flow for a 2-D, non-separable filter, in accordance with an embodiment of the inventive subject matter. In one embodiment, input pixel data 802 from a RAM (e.g., RAM 502, FIG. 5) enters the filter.

A stage I filter 804 is implemented when enough data is brought into the stage, in one embodiment. For a 2-D non-separable filter, stage I filtering involves multiplying each pixel value within a sub-block (e.g., sub-block 320, FIG. 3) by a matrix of horizontal coefficients. A sum of each row of products is then generated.

A rounding operation 806 is performed on the filtered partial results, which involves adding "1" to the result obtained in block 804, and then shifting the resulting sum to the right to get a desired number of bits.

The row product sums are then combined by adder 808, to produce a filtered result for the center pixel.

Post-processing is then performed. In one embodiment, post-processing includes a normalization operation 810. Post-processing alternatively may include a second rounding operation 812. The normalized result 814 and the rounded result 816 may then be selected by multiplexer 818 as an output result 820.

FIG. 9 is a diagram illustrating data flow for a two-dimensional, separable filter, in accordance with an embodiment of the inventive subject matter. In one embodiment, input pixel data 902 from a RAM (e.g., RAM 502, FIG. 5) enters the filter.

A stage I filter 904 is implemented when enough data is brought into the stage, in one embodiment. For a 2-D separable filter, stage I filtering involves multiplying each pixel value within a sub-block (e.g., sub-block 320, FIG. 3) by a matrix of horizontal coefficients, and calculating the sum of the products.

A rounding operation 906 is performed on the filtered partial results, which involves, in one embodiment, adding or subtracting $2^{(shift\_value-1)}$ to the input and shifting the result by shift_value. Shift_value is determined by the filter coefficients and a normalization value used to perform normalization. Because filtering involves multiplying various pixels by filter coefficients, the final products are normalized by dividing them with appropriate normalization values. In an alternate embodiment, a division process may be performed. However, division may be more difficult to implement, so a multiplication process, followed by a shifting process may be used to obtain the same result.

In various embodiments, rounding may be performed as follows: 1) +ve and −ve (i.e., positive and negative) values may be rounded toward zero; 2) +ve and −ve values may be rounded away from zero; 3) +ve values may be rounded toward zero, while −ve values are rounded away from zero; or 4) +ve values may be rounded away from zero, while −ve values are rounded toward zero.

In one embodiment, the partial results are stored within an intermediate result storage element (e.g., element 512, FIG. 5).

A stage II filter 908 is implemented when enough intermediate result data is available to the stage, in one embodiment. Stage II filtering involves multiplying each pixel value within the sub-block by a matrix of vertical coefficients, and calculating the sum of the products, to produce a horizontally and vertically filtered result for the center pixel.

Post-processing is then performed. In one embodiment, post-processing includes a normalization operation 910. Post-processing alternatively may include a second rounding operation 912. The normalized result 914 and the rounded result 916 may then be selected by multiplexer 918 as an output result 920.

Figure 10:
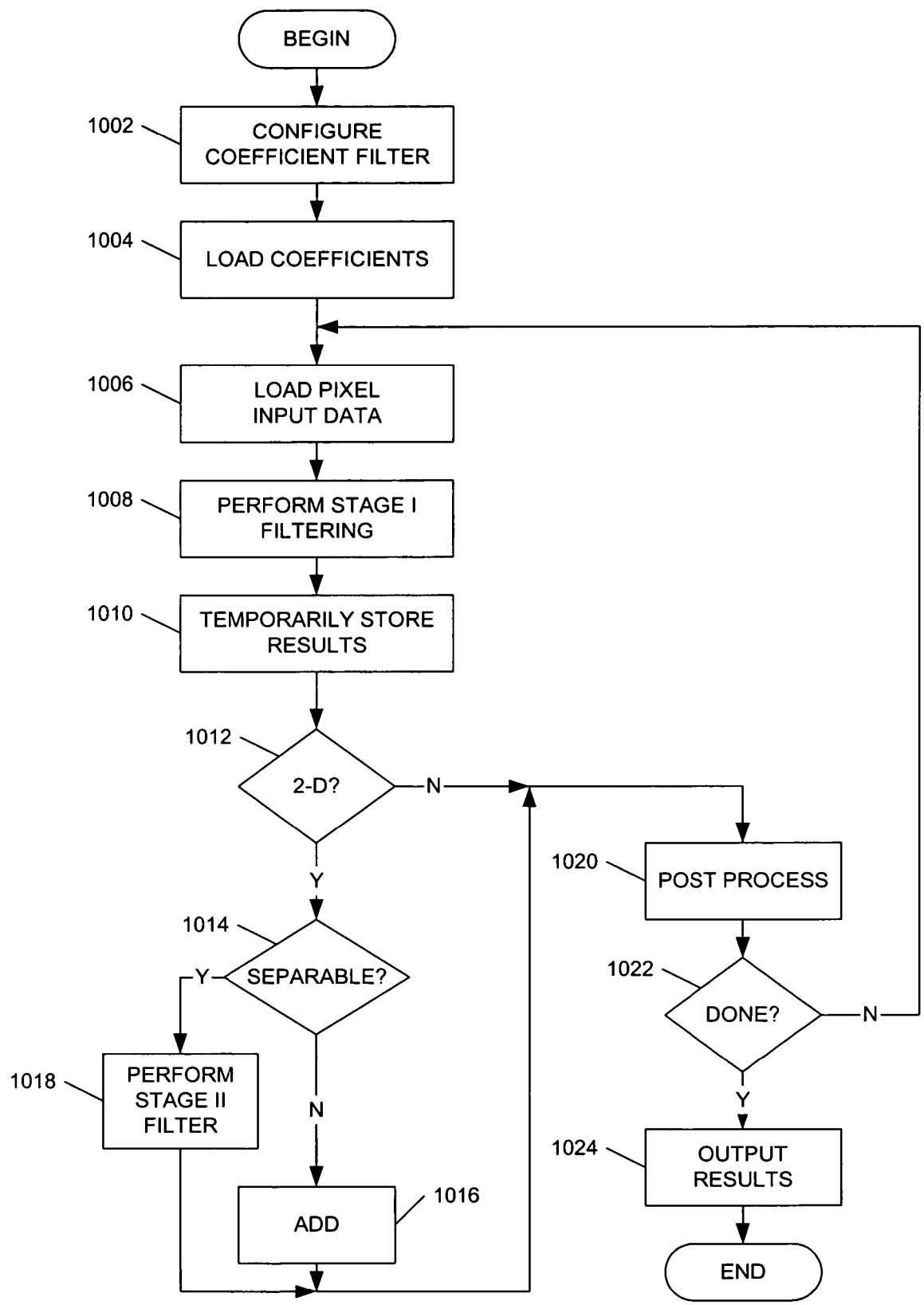
FIG. 10 is a flowchart of a method for performing a configurable coefficient filter, in accordance with an embodiment of the inventive subject matter.

FIG. 10 is a flowchart of a method for performing a configurable coefficient filter, in accordance with an embodiment of the inventive subject matter. The method begins, in block 1002, by configuring a coefficient filter to perform a selected filtering operation of a set of pixel input values. In one embodiment, configuration includes a user selecting a filtering operation from a group of operations that includes a 1-D filtering operation and one or more 2-D filtering operations. In a further embodiment, the 2-D operations that may be selected from include a separable 2-D filtering operation and a non-separable 2-D filtering operation.

In addition to the filter type, the size of the coefficient matrix (e.g., F3, F5, F7, etc.) also can be configured, as well as the type of input data, and other parameters. The configuration information can be loaded into a mode register (e.g., register 506, FIG. 5) using a command from a host processor or other command source.

In block 1004, horizontal dimension and/or vertical dimension coefficients may be loaded into a register bank (e.g., bank 510, FIG. 5). These coefficient matrices will be made available to the filtering stage(s).

In block 1006, pixel input data is loaded into a RAM (e.g., RAM 502, FIG. 5), which is accessible to the stage I filter. When sufficient data is available, then the stage I filtering process is performed, in block 1008, in a first dimension. Stage I filtering involves multiplying a sub-block of pixel values by horizontal dimension coefficients. In one embodiment, the first dimension is the horizontal dimension. In another embodiment, the first dimension is the vertical dimension. The stage I filtering process produces one or more first filter output values, which are temporarily stored in a storage element (e.g., storage element 512, FIG. 5), in block 1010.

A determination is made, in block 1012, whether the filtering operation is a 1-D or 2-D filtering operation. If it is a 1-D operation, then the procedure jumps to block 1020, described later, where post-processing is performed.

If the filtering operation is a 2-D filtering operation, then a further determination is made, in block 1014, whether the filtering operation is separable or non-separable. If the operation is non-separable, then in block 1016, the first filter output values are added together, as each value constitutes a row-sum of coefficient/pixel value products, in one embodiment. If the operation is separable, then in block 1018, a stage II filtering operation is performed, in a second dimension that is orthogonal to the first dimension. Stage II filtering involves multiplying the first filter output values by vertical dimension coefficients. In one embodiment, the second dimension is the vertical dimension. In another embodiment, the second dimension is the horizontal dimension.

The output of the stage II filtering process (or the output of the stage I process, in the case of 1-D processing) is post-processed, in block 1020. As described previously, post-processing may include normalization, shifting, and/or rounding operations.

A determination is made whether all pixels have been processed, in block 1022. If not, then a next sub-block is selected for filtering (in the same or a different swath), and the procedure iterates as shown. If so, then the results of the post-processing procedure are output, in block 1024, and the method ends.

In one embodiment, the first filtering operation is performed on a sub-block of pixel data that corresponds to a leftmost sub-block within a top swath of an image. After processing the first sub-block, a second sub-block is selected for processing, where the second sub-block is shifted one pixel to the right of the first processed pixel. Filtering is then performed on the second sub-block, to produce a second filtered pixel.

The filtering and shifting process continues until the rightmost sub-block within the swath is processed. At that point, processing begins for a next swath, located below the first swath. The next swath may overlap the first swath by one or more pixel rows. This processing continues until the rightmost sub-block of the lowest swath of the image has been processed.

In alternate embodiments, filtering can be performed in different directions and in a different sequence. For example, stage I filtering could be performed in a vertical dimension, and stage II filtering could be performed in a horizontal dimension. Further, a swath could extend in a vertical dimension rather than a horizontal dimension. In still other embodiments, successive sub-block processing could occur from the right to the left, and swaths could be selected starting at the bottom of an image, and working upward. Other sequential processing variations could be imagined by those of skill in the art, based on the description herein.

The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Although embodiments of the invention, described above, discuss a programmable coefficient filter in detail, other embodiments could be implemented in non-programmable coefficient filters. Further, although examples are given of filters having certain numbers of taps, the number of taps can be greater than, less than, or in-between the number of taps specified in the given examples.

The operations described above, with respect to the methods illustrated and described herein, can be performed in a different order from that disclosed. Also, it will be understood that, although some methods are described as having an "end," they may be continuously performed.

The various procedures described herein can be implemented in hardware, firmware or software. A software implementation can use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read-only memories (ROMs), and the like. Accordingly, a computer-readable medium, including those listed above, may store program instructions thereon to perform a method, which when executed within an electronic device, result in embodiments of the inventive subject matter being carried out.

What is claimed is:

1. A method performed by at least one processor comprising:

configuring a configurable coefficient filter to perform a selected filtering operation of a set of pixel input values, the operation including determining a filtered pixel value for a selected pixel, wherein configuring comprises selecting the filtering operation from a group of operations, wherein configuring further comprises the at least one processor evaluating configuration information in a mode register storing information that indicates the selected filtering operation to be performed by the filter, wherein the information in the mode register includes a field indicating a filter size, wherein the filter size indicates a size of a matrix of a sub-block of n×m pixel values from the set of pixel input values, wherein n equals a number of pixel values in a row of the sub-block, wherein m equals a number of pixel values in a column of the sub-block, wherein n and m are positive integers, and wherein the selected pixel is located at a center of the matrix;

the at least one processor performing a first stage of the selected filtering operation by filtering the set of pixel input values in a first dimension, to produce one or more first filter output values, wherein filtering the set of pixel input values in the first dimension comprises multiplying each pixel value in the sub-block by a corresponding coefficient of a first array of coefficients, the first array having the same size as the matrix of pixel values;

the at least one processor determining that the selected filtering operation is a two-dimensional filtering operation, wherein determining comprises evaluating configuration information in the mode register; and in response to determining that the selected filtering operation is the two-dimensional filtering operation, the at least one processor performing a second stage of the selected filtering operation by filtering the one or more first filter output values in a second dimension, which is orthogonal to the first dimension, to produce a second filter output value, wherein filtering the set of pixel input values in the second dimension comprises multiplying each pixel value in the sub-block by a corresponding coefficient of a second array of coefficients, the second array having the same size as the matrix of pixel values.

2. The method of claim 1, wherein configuring the filter comprises:
selecting the selected filtering operation from a group of operations that includes a one-dimensional filtering operation and one or more two-dimensional filtering operations.

3. The method of claim 1, wherein configuring the filter comprises:
selecting the selected filtering operation from a group of operations that includes a separable two-dimensional filtering operation and a non-separable two-dimensional filtering operation.

4. The method of claim 1, further comprising:
temporarily storing at least some of the one or more first filter output values prior to performing the second stage.

5. The method of claim 1, wherein performing the first stage of the selected filtering operation comprises:
adding the multiplied first dimension pixel values to produce the one or more first filter output values.

6. The method of claim 1, wherein performing the second stage of the selected filtering operation comprises:
adding the multiplied second dimension pixel values to produce the second filter output value.

7. The method of claim 1, wherein the configuration information comprises type of filter, and wherein the types include one of a one-dimensional, a two-dimensional separable, and a two-dimensional non-separable filter.

8. The method of claim 1, wherein the configuration information comprises filter coefficients.

9. The method of claim 1, wherein the configuration information comprises number of filter taps.

10. The method of claim 1, wherein the configuration information comprises input data format.

11. The method of claim 1, wherein the configuration information comprises input mode.

12. The method of claim 1, wherein the configuration information comprises filter mode.

13. The method of claim 1, wherein the configuration information comprises one of swath height, normalization value, and shift value.

14. The method of claim 1, wherein the first dimension is a horizontal dimension, and wherein the second dimension is a vertical dimension.

15. The method of claim 1, wherein m and n are odd integers.

16. The method of claim 1, wherein m and n are even integers.

17. A computer-readable medium having program instructions stored thereon, which when executed by a processor, perform the operations of:
configuring a configurable coefficient filter to perform a selected filtering operation of a set of pixel input values, the operation including determining a filtered pixel value for a selected pixel, wherein configuring comprises selecting the filtering operation from a group of operations, wherein configuring further comprises the processor evaluating configuration information in a mode register storing information that indicates the selected filtering operation to be performed by the filter, wherein the information in the mode register includes a field indicating a filter size, wherein the filter size indicates a size of a matrix of a sub-block of n×m pixel values from the set of pixel input values, wherein n equals a number of pixel values in a row of the sub-block, wherein m equals a number of pixel values in a column of the sub-block, wherein n and m are positive integers, and wherein the selected pixel is located at a center of the matrix;

the processor performing a first stage of the selected filtering operation by filtering the set of pixel input values in a first dimension, to produce one or more first filter output values, wherein filtering the set of pixel input values in the first dimension comprises multiplying each pixel value in the sub-block by a corresponding coefficient of a first array of coefficients, the first array having the same size as the matrix of pixel values;

the processor determining that the selected filtering operation is a two-dimensional filtering operation, wherein determining comprises evaluating configuration information in the mode register; and in response to determining that the selected filtering operation is the two-dimensional filtering operation, the processor performing a second stage of the selected filtering operation by filtering the one or more first filter output values in a second dimension, which is orthogonal to the first dimension, to produce a second filter output value, wherein filtering the set of pixel input values in the second dimension comprises multiplying each pixel value in the sub-block by a corresponding coefficient of a second array of coefficients, the second array having the same size as the matrix of pixel values.

18. The computer-readable medium of claim 17, wherein execution of the method further results in:
selecting the selected filtering operation from a group of operations that includes a one-dimensional filtering operation and one or more two-dimensional filtering operations.

19. The computer-readable medium of claim 17, wherein execution of the method further results in:
selecting the selected filtering operation from a group of operations that includes a separable two-dimensional filtering operation and a non-separable two-dimensional filtering operation.

20. The computer-readable medium of claim 17, wherein execution of the method further results in:
temporarily storing at least some of the one or more first filter output values prior to performing the second stage.

* * * * *

UNITED STATES PATENT AND TRADEMARK OFFICE
CERTIFICATE OF CORRECTION

| | | |
|---|---|---|
| PATENT NO. | : 7,590,300 B2 | Page 1 of 1 |
| APPLICATION NO. | : 10/876235 | |
| DATED | : September 15, 2009 | |
| INVENTOR(S) | : Tadas et al. | |

It is certified that error appears in the above-identified patent and that said Letters Patent is hereby corrected as shown below:

In column 12, line 15, in Claim 17, delete "matrix:" and insert -- matrix; --, therefor.

Signed and Sealed this

Sixteenth Day of February, 2010

David J. Kappos
*Director of the United States Patent and Trademark Office*